United States Patent
Dorr

(10) Patent No.: US 10,657,585 B2
(45) Date of Patent: *May 19, 2020

(54) ON-LINE AUCTION SALES LEADS

(71) Applicant: eBay Inc., San Jose, CA (US)

(72) Inventor: Robert C. Dorr, Colorado City, CO (US)

(73) Assignee: eBay Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/022,003

(22) Filed: Sep. 9, 2013

(65) Prior Publication Data

US 2014/0006203 A1 Jan. 2, 2014

Related U.S. Application Data

(63) Continuation of application No. 09/769,546, filed on Jan. 24, 2001, now Pat. No. 8,533,094.

(60) Provisional application No. 60/178,147, filed on Jan. 26, 2000.

(51) Int. Cl.
| | | |
|---|---|---|
| *G06Q 40/00* | (2012.01) | |
| *G06Q 30/08* | (2012.01) | |
| *G06Q 30/02* | (2012.01) | |

(52) U.S. Cl.
CPC .......... *G06Q 30/08* (2013.01); *G06Q 30/02* (2013.01)

(58) Field of Classification Search
CPC ........ G06Q 40/00; G06Q 30/08; G06Q 30/02
USPC ................... 705/35, 37, 39, 40, 14.4, 14.71
See application file for complete search history.

(56) References Cited

U.S. PATENT DOCUMENTS

| | | |
|---|---|---|
| 4,996,642 A | 2/1991 | Hey |
| 5,310,997 A | 5/1994 | Roach et al. |
| 5,583,763 A | 12/1996 | Atcheson et al. |
| 5,749,081 A | 5/1998 | Whiteis |
| 5,790,426 A | 8/1998 | Robinson |
| 5,790,790 A | 8/1998 | Smith et al. |

(Continued)

FOREIGN PATENT DOCUMENTS

| | | |
|---|---|---|
| EP | 0957437 A2 | 11/1999 |
| WO | WO-0017792 A1 | 3/2000 |

(Continued)

OTHER PUBLICATIONS

"U.S. Appl. No. 13/565,661, Final Office Action dated Feb. 24, 2015", 16 pgs.

(Continued)

*Primary Examiner* — Lalita M Hamilton
(74) *Attorney, Agent, or Firm* — Schwegman Lundberg & Woessner, P.A.

(57) ABSTRACT

A method for generating on-line sales leads in an on-line auction. The method determines when a prospective bidder for an on-line auction of a specific item by a seller accesses the on-line screen for the item. The method obtains the e-mail address of the prospective bidder and either correlates the e-mail address of the prospective bidder with the item by seller or with a classification for the item. The correlated e-mail address is then delivered to the seller or to a purchaser and may be accompanied with information identifying the specific item, the classification, whether a bid was made or not, etc. Furthermore, the delivery occurs at periodic fixed time intervals or when a fixed number of e-mail addresses are obtained.

17 Claims, 4 Drawing Sheets

(56) References Cited

U.S. PATENT DOCUMENTS

| | | | |
|---|---|---|---|
| 5,825,881 A | 10/1998 | Colvin, Sr. | |
| 5,842,199 A | 11/1998 | Miller et al. | |
| 5,845,265 A | 12/1998 | Woolston | |
| 5,897,622 A | 4/1999 | Blinn et al. | |
| 6,016,475 A | 1/2000 | Miller et al. | |
| 6,041,311 A | 3/2000 | Chislenko et al. | |
| 6,047,264 A | 4/2000 | Fisher et al. | |
| 6,049,777 A | 4/2000 | Sheena et al. | |
| 6,055,513 A | 4/2000 | Katz et al. | |
| 6,064,980 A | 5/2000 | Jacobi et al. | |
| 6,085,176 A | 7/2000 | Woolston | |
| 6,085,229 A | 7/2000 | Newman et al. | |
| 6,092,049 A | 7/2000 | Chislenko et al. | |
| 6,101,484 A | 8/2000 | Halbert et al. | |
| 6,101,486 A | 8/2000 | Roberts et al. | |
| 6,108,493 A | 8/2000 | Miller et al. | |
| 6,119,101 A | 9/2000 | Peckover | |
| 6,119,137 A | 9/2000 | Smith et al. | |
| 6,178,408 B1 | 1/2001 | Copple et al. | |
| 6,192,407 B1 | 2/2001 | Smith et al. | |
| 6,202,051 B1 | 3/2001 | Woolston | |
| 6,243,691 B1 | 6/2001 | Fisher et al. | |
| 6,246,997 B1 | 6/2001 | Cybul et al. | |
| 6,266,649 B1 | 7/2001 | Linden et al. | |
| 6,308,168 B1 | 10/2001 | Dovich et al. | |
| 6,313,745 B1 | 11/2001 | Suzuki | |
| 6,317,722 B1 | 11/2001 | Jacobi et al. | |
| 6,321,221 B1 | 11/2001 | Bieganski | |
| 6,334,127 B1 | 12/2001 | Bieganski et al. | |
| 6,356,879 B2 | 3/2002 | Aggarwal et al. | |
| 6,370,513 B1 | 4/2002 | Kolawa et al. | |
| 6,408,281 B1 * | 6/2002 | Shell | G06Q 20/10 705/14.1 |
| 6,412,012 B1 | 6/2002 | Bieganski et al. | |
| 6,415,099 B1 | 7/2002 | Berger | |
| 6,415,270 B1 * | 7/2002 | Rackson et al. | 705/36 R |
| 6,484,149 B1 | 11/2002 | Jammes et al. | |
| 6,487,539 B1 | 11/2002 | Aggarwal et al. | |
| 6,519,570 B1 * | 2/2003 | Faber | G06Q 10/0631 705/1.1 |
| 6,519,571 B1 * | 2/2003 | Guheen | G06Q 30/02 705/14.66 |
| 6,587,838 B1 * | 7/2003 | Esposito et al. | 705/7.29 |
| 6,615,247 B1 | 9/2003 | Murphy | |
| 6,636,836 B1 | 10/2003 | Pyo | |
| 6,754,636 B1 | 6/2004 | Walker et al. | |
| 6,772,150 B1 | 8/2004 | Whitman et al. | |
| 6,785,671 B1 | 8/2004 | Bailey et al. | |
| 6,801,909 B2 | 10/2004 | Delgado et al. | |
| 6,813,775 B1 | 11/2004 | Finseth et al. | |
| 6,853,982 B2 | 2/2005 | Smith et al. | |
| 6,865,546 B1 | 3/2005 | Song | |
| 6,963,850 B1 * | 11/2005 | Bezos et al. | 705/7.29 |
| 7,016,863 B1 * | 3/2006 | Kamakura et al. | 705/14.32 |
| 7,110,967 B1 | 9/2006 | Espenes et al. | |
| 7,613,633 B1 | 11/2009 | Woolston | |
| 7,818,284 B1 * | 10/2010 | Walker | G06Q 20/387 705/26.2 |
| 8,275,673 B1 | 9/2012 | Poon | |
| 8,533,094 B1 | 9/2013 | Dorr | |
| 9,165,300 B2 | 10/2015 | Poon et al. | |
| 2001/0021914 A1 | 9/2001 | Jacobi et al. | |
| 2001/0021921 A1 | 9/2001 | Kan et al. | |
| 2001/0037255 A1 | 11/2001 | Tambay | |
| 2001/0037259 A1 | 11/2001 | Sharma et al. | |
| 2001/0054021 A1 | 12/2001 | Kawakura et al. | |
| 2001/0056395 A1 | 12/2001 | Khan | |
| 2002/0010625 A1 | 1/2002 | Smith et al. | |
| 2002/0022994 A1 | 2/2002 | Miller et al. | |
| 2002/0026386 A1 | 2/2002 | Walden | |
| 2002/0052873 A1 | 5/2002 | Delgado et al. | |
| 2002/0055890 A1 | 5/2002 | Foley | |
| 2002/0062268 A1 | 5/2002 | Sato et al. | |
| 2002/0065760 A1 | 5/2002 | Wiesehuegel et al. | |
| 2002/0065877 A1 | 5/2002 | Kowtko et al. | |
| 2002/0099629 A1 | 7/2002 | Sato et al. | |
| 2002/0103692 A1 | 8/2002 | Rosenberg et al. | |
| 2002/0138331 A1 | 9/2002 | Hosea et al. | |
| 2002/0143660 A1 | 10/2002 | Himmel et al. | |
| 2002/0147628 A1 | 10/2002 | Specter et al. | |
| 2002/0156686 A1 | 10/2002 | Kraft et al. | |
| 2002/0161664 A1 | 10/2002 | Shaya et al. | |
| 2002/0174428 A1 | 11/2002 | Agnihotri et al. | |
| 2002/0184116 A1 | 12/2002 | Tam et al. | |
| 2002/0198882 A1 | 12/2002 | Linden et al. | |
| 2003/0028427 A1 | 2/2003 | Dutta et al. | |
| 2003/0037041 A1 | 2/2003 | Hertz | |
| 2003/0051240 A1 | 3/2003 | Schaffer et al. | |
| 2003/0069740 A1 | 4/2003 | Zeidman | |
| 2003/0084450 A1 | 5/2003 | Thurston et al. | |
| 2003/0093331 A1 | 5/2003 | Childs et al. | |
| 2003/0093793 A1 | 5/2003 | Gutta | |
| 2003/0105682 A1 | 6/2003 | Dicker et al. | |
| 2003/0110056 A1 | 6/2003 | Berghofer et al. | |
| 2003/0131070 A1 | 7/2003 | Stroebel et al. | |
| 2003/0145326 A1 | 7/2003 | Gutta et al. | |
| 2003/0182249 A1 | 9/2003 | Buczak | |
| 2003/0208399 A1 | 11/2003 | Basak et al. | |
| 2003/0217332 A1 | 11/2003 | Smith et al. | |
| 2003/0233655 A1 | 12/2003 | Gutta et al. | |
| 2004/0039657 A1 | 2/2004 | Behrens et al. | |
| 2004/0078214 A1 | 4/2004 | Speiser et al. | |
| 2004/0143450 A1 | 7/2004 | Vidali | |
| 2004/0230499 A1 | 11/2004 | Stack | |
| 2004/0267613 A1 | 12/2004 | Chan et al. | |
| 2005/0028207 A1 | 2/2005 | Finseth et al. | |
| 2005/0038717 A1 | 2/2005 | McQueen et al. | |
| 2005/0055713 A1 | 3/2005 | Lee et al. | |
| 2012/0296764 A1 | 11/2012 | Poon et al. | |
| 2016/0042435 A1 | 2/2016 | Poon | |

FOREIGN PATENT DOCUMENTS

| | | |
|---|---|---|
| WO | WO-0017793 A1 | 3/2000 |
| WO | WO-0045319 A1 | 8/2000 |
| WO | WO-0116848 A2 | 3/2001 |
| WO | WO-0129726 A2 | 4/2001 |
| WO | WO-0131537 A2 | 5/2001 |
| WO | WO-0133401 A2 | 5/2001 |
| WO | WO-0219203 A2 | 3/2002 |
| WO | WO-0229695 A1 | 4/2002 |
| WO | WO-0237926 A2 | 5/2002 |

OTHER PUBLICATIONS

"U.S. Appl. No. 13/565,661, Non Final Office Action dated Oct. 1, 2014", 27 pgs.

"U.S. Appl. No. 13/565,661, Response filed Mar. 4, 2014 to Final Office Action dated Dec. 4, 2013", 11 pgs.

"U.S. Appl. No. 13/565,661, Response filed Dec. 31, 2014 to Non Final Office Action dated Oct. 1, 2014", 14 pgs.

"U.S. Appl. No. 13/565,661, Notice of Allowance dated Jun. 10, 2015", 15 pgs.

"U.S. Appl. No. 13/565,661, Response filed May 26, 2015 to Final Office Action dated Feb. 24, 2015", 27 pgs.

"U.S. Appl. No. 09/769,546, Advisory Action dated Mar. 15, 2007", 3 pgs.

"U.S. Appl. No. 09/769,546, Advisory Action dated Mar. 19, 2008", 3 pgs.

"U.S. Appl. No. 09/769,546, Advisory Action dated Mar. 19, 2009", 3 pgs.

"U.S. Appl. No. 09/769,546, Decision on Appeal dated Feb. 21, 2012", 11 pgs.

"U.S. Appl. No. 09/769,546, Examiner's Answer to Appeal Brief dated Jul. 10, 2009", 13 pgs.

"U.S. Appl. No. 09/769,546, Final Office Action dated Jan. 9, 2009", 6 pgs.

"U.S. Appl. No. 09/769,546, Final Office Action dated Nov. 16, 2007", 6 pgs.

"U.S. Appl. No. 09/769,546, Final Office Action dated Dec. 1, 2006", 5 pgs.

(56) References Cited

OTHER PUBLICATIONS

"U.S. Appl. No. 09/769,546, Non Final Office Action dated Apr. 6, 2005", 8 pgs.
"U.S. Appl. No. 09/769,546, Non Final Office Action dated May 16, 2007", 8 pgs.
"U.S. Appl. No. 09/769,546, Non Final Office Action dated Aug. 30, 2012", 11 pgs.
"U.S. Appl. No. 09/769,546, Non-Final Office Action dated Jun. 27, 2008", 5 pgs.
"U.S. Appl. No. 09/769,546, Notice of Allowance dated May 10, 2013", 7 pgs.
"U.S. Appl. No. 09/769,546, Reply Brief filed Sep. 10, 2009", 6 pgs.
"U.S. Appl. No. 09/769,546, Response filed Jan. 30, 2013 to Non Final Office Action dated Aug. 30, 2012", 12 pgs.
"U.S. Appl. No. 09/769,546, Response filed Feb. 7, 2008 to Final Office Action dated Nov. 16, 2007", 10 pgs.
"U.S. Appl. No. 09/769,546, Response filed Feb. 24, 2009 to Final Office Action dated Jan. 9, 2009", 10 pgs.
"U.S. Appl. No. 09/769,546, Response filed Mar. 1, 2007 to Final Office Action dated Dec. 1, 2006", 9 pgs.
"U.S. Appl. No. 09/769,546, Response filed Apr. 9, 2009 to Advisory Action dated Mar. 19, 2009", 21 pgs.
"U.S. Appl. No. 09/769,546, Response filed Apr. 20, 2012 to Final Office Action dated Jan. 9, 2009", 10 pgs.
"U.S. Appl. No. 09/769,546, Response filed Jun. 9, 2005 to Non Final Office Action dated Apr. 6, 2005", 11 pgs.
"U.S. Appl. No. 09/769,546, Response filed Aug. 15, 2007 to Non Final Office Action dated May 16, 2007", 9 pgs.
"U.S. Appl. No. 09/769,546, Response filed Sep. 29, 2008 to Non-Final Office Action dated Jun. 27, 2008", 14 pgs.
"U.S. Appl. No. 10/263,224, Appeal Brief filed Sep. 19, 2007", 25 pgs.
"U.S. Appl. No. 10/263,224, Appeal Decision dated Aug. 24, 2011", 8 pgs.
"U.S. Appl. No. 10/263,224, Examiner Interview Summary dated May 23, 2012", 10 pgs.
"U.S. Appl. No. 10/263,224, Final Office Action dated Jun. 25, 2007", 9 pgs.
"U.S. Appl. No. 10/263,224, Final Office Action dated Aug. 1, 2005", 11 pgs.
"U.S. Appl. No. 10/263,224, Non Final Office Action dated Jan. 26, 2006", 12 pgs.
"U.S. Appl. No. 10/263,224, Non Final Office Action dated Feb. 28, 2012", 11 pgs.
"U.S. Appl. No. 10/263,224, Non Final Office Action dated Mar. 8, 2005", 19 pgs.
"U.S. Appl. No. 10/263,224, Non Final Office Action dated Jun. 19, 2006", 16 pgs.
"U.S. Appl. No. 10/263,224, Non Final Office Action dated Dec. 13, 2006", 11 pgs.
"U.S. Appl. No. 10/263,224, Notice of Allowance dated May 23, 2012", 15 pgs.
"U.S. Appl. No. 10/263,224, Reply Brief filed Jan. 17, 2008", 5 pgs.
"U.S. Appl. No. 10/263,224, Response filed Mar. 9, 2006 to Non Final Office Action dated Jan. 26, 2006", 15 pgs.
"U.S. Appl. No. 10/263,224, Response filed Mar. 13, 2007 to Non Final Office Action dated Dec. 13, 2006", 13 pgs.
"U.S. Appl. No. 10/263,224, Response filed May 3, 2012 to Non Final Office Action dated Feb. 28, 2012", 14 pgs.
"U.S. Appl. No. 10/263,224, Response filed May 6, 2005 to Non Final Office Action dated Mar. 8, 2005", 14 pgs.
"U.S. Appl. No. 10/263,224, Response filed Sep. 18, 2006 to Non Final Office Action dated Jun. 19, 2006", 14 pgs.
"U.S. Appl. No. 10/263,224, Response filed Nov. 14, 2005 to Final Office Action dated Aug. 1, 2005", 15 pgs.
"U.S. Appl. No. 13/565,661, Final Office Action dated Dec. 4, 2013", 16 pgs.
"U.S. Appl. No. 13/565,661, Non Final Office Action dated Jun. 4, 2013", 14 pgs.
"U.S. Appl. No. 13/565,661, Non Final Office Action dated Dec. 5, 2012", 10 pgs.
"U.S. Appl. No. 13/565,661, Response filed Mar. 5, 2013 to Non Final Office Action dated Dec. 5, 2012", 13 pgs.
"U.S. Appl. No. 13/565,661, Response filed Sep. 4, 2013 to Non Final Office Action dated Jun. 4, 2013", 10 pgs.
"Computer Letter, Private Profiles—NexTag—Of all the auction sites on the Web, here's one an economist might like", vol. 15, No. 28, [Online]. Retrieved from the Internet: <URL: http://www.nextag.com/serv/main/about/computer/letter.html>, (Aug. 23, 1999), 3 pgs.
"eBizAutos: It All About the Cars", [Online]. Retrieved from the Internet: <URL: http://www.ebizautos.com/>, (Accessed Apr. 15, 2005), 2 pgs.
"WebSphere Commerce Professional Edition", [Online]. Retrieved from the Internet: <URL: http://www-306.ibm.com/software/genservers/commerce/wcpe/>, (Accessed Apr. 21, 2005), 4 pgs.
Andale Gallery, "Prominently Featured on Your Listings", Copyright © 2001 Andale, Inc., [Online]. Retrieved from the Internet: <URL: http://www.andale.com/corp/tour/gal_tour4.html> Accessed on Web—Apr. 15, 2005, (Accessed Apr. 15, 2005), 1 pg.
Ansari, A., "Internet Recommendation System", Journal of Marketing Research, vol. 37(3), Proquest #57914570, (Aug. 2000), 13 pgs.
Ardissono, Liliana, et al., "Tailoring the Interaction With Users in Electronic Shops", Proceedings of the Seventh International Conference on User Modeling, Banff, Canada, (1999), 35-44.
Balabanovic, Marko, "An Adaptive Web Page Recommendation Service", Stanford University Digital Libraries Project Working Paper, Proceedings of the First International Conference on Autonomous Agents, (1999), 378-385.
Breese, John S, et al., "Empirical Analysis of Predictive Algorithms for Collaborative Filtering", Technical Report MSR-TR-98-12—Microsoft Research, (May 1998—Revised Oct. 1998), 1-21.
Burke, Robin, "The Wasabi Personal Shopper: a case-based recommender system", Proceedings of the Sixteenth National Conference on Artificial Intelligence and the Eleventh Innovative Applications of Artificial Intelligence Conference Innovative Applications of Artificial Intelligence, (1999), 844-849.
Changchien, S, "Mining association rules procedure to support online recommendation by customers and product fragmentation", Expert Systems with Application, 20(4), (May 2001), 325-335.
Cheung, N., "Buy this! [e-commerce recommendation software]", Information Age, (Feb. 2001), 33-4.
Cheung, W., "Mining customer preference ratings for product recommendation using the support vector machine and the latent class model", Proceedings of the 2nd International Conference on Data Mining Methods and Databases for Engineering, Finance and Other Fields, Cambridge, UK, (Jul. 2000), 601-10.
Chien, Yi-Ying, "A personalized Internet shopping agent", Proceedings of the International Conference on Parallel and Distributed Processing Techniques and Applications. PDPTA'2000, pt. 4, (2000), 1849-55.
Chun, In-Gook, et al., "The implementation of knowledge-based recommender system for electronic commerce using Java expert system library", International Symposium on Industrial Electronics, 2001. Proceedings. ISIE 2001, vol. 3, (Jun. 12-16, 2001), 1766-1770.
Claypool, Mark, et al., "Inferring User Interest (Aug. 2001)", Computer Science Technical Report Series, (Aug. 31, 2001), 1-17.
Cotlier, Moira, "The Electronic Catalog: Upselling Online Can Raise Top Line", Catalog Age, 18(7), (Jun. 1, 2001), 93.
Demiriz, Ayhan, "Enhancing Product Recommender Systems on Sparse Binary Data", E-Buisiness Department, Verizon, Inc., (2002), 1-17.
Flynn, B., "Next Hot Web Play? Precision Targeting", Brandweek, 42(i8), Proquest #68864267., (Feb. 19, 2001), 21(3pgs).
Greco, Carl, "What you should know before joining an Internet Mall", Direct Marketing, 61(10), (Feb. 1999), 42-3.
Harvey, L., ""On Birthdays" mortgages, ice cream sundaes, and term life. How personalization and cross selling tools provide cross-selling in the enterprise", E-business Strategies & Solutions, (Jul. 1999), 31-5.

(56) References Cited

OTHER PUBLICATIONS

Hirooka, Yasuo, et al., "Extending Content-Based Recommendation by Order-Matching and Cross-Matching Methods", Lecture Notes in Computer Science; vol. 1875, Proceedings of the First International Conference on Electronic Commerce and Web Technologies, (2000), 177-190.
Iacobucci, Dawn, "Recommendation Agents on the Internet", Journal of Interactive Marketing, 14(3), (2000), 2-11.
Kanemoto, H, "Web Customer Action Analysis System", Matsushita Technical Journal, 48(1), (Feb. 2002), 26-29.
Karypis, George, "Evaluation of Item-Based Top-N Recommendation Algorithms", Technical Report #00-046, http://www-users.cs.umn.edu/~karypis/publications/Papers/PDF/itemrs.pdf, (2000), 1-13.
Kitts, Brendan, et al., "Cross-sell: A Fast Promotion-Tunable Customer-item Recommendation Method Based on Conditionally Independent Probabilities", Proceedings of the sixth ACM SIGKDD international conference on Knowledge discovery and data mining, Boston, MA USA, (Aug. 2000), 437-446.
Kohrs, Arnd, et al., "Using category-based collaborative filtering in the Active WebMuseum", 2000 IEEE International Conference on Multimedia and Expo, 2000. ICME 2000, vol. 1, (Jul. 30-Aug. 2, 2000), 351-354.
Kumar, Ravi, "Recommendation Systems: A Probabilistic Analysis", Journal of Computer and System Sciences, 63(1), (Aug. 2001), 42-61.
Kwak, Mary, "Web Sites Learn to Make Smarter Suggestions", MIT Sloan Management Review, 42(4), (Summer 2001), 17.
Kwak, Mira, "Collaborative filtering with automatic rating for recommendation", IEEE International Symposium on Industrial Electronics, 2001. Proceedings. ISIE 2001, vol. 1, (Jun. 12-16, 2001), 625-628.
Kyeonah, Yu, "Improving the performance of collaborative recommendation by using multi-level similarity computation", Artificial Intelligence and Soft Computing : Proceedings of the IASTED International Conference,, (Jul. 24-26, 2000), 241-5.
Lee, Wee Sun, "Collaborative Learning for Recommender Systems", Proceedings of the Eighteenth International Conference on Machine Learning, (2001), 314-321.
Lin, Weiyang, et al., "Efficient Adaptive-Support Association Rule Mining for Recommender Systems", Data Mining and Knowledge Discovery, 6(1), (2001), 83-105.
Loney, Fred N, "Faceted Preference Matching in Recommender Systems", Proceedings of the Second International Conference on Electronic Commerce and Web Technologies, (2001), 295-304.
Maes, Pattie, et al., "Agents that Buy and Sell", Communications of the ACM 42(3), (Mar. 1999), 81-91.
McAllister, Neil, "Getting Personal", New Architect, (Nov. 2001), 1-8.
Pedersen, P., "Behavioral Effects of Using Software Agents for Product and Merchant Brokering: An Experimental Study of Consumer Decision-Making", International Journal of Electronic Commerce, 5(1), (Fall 2000), 125-141.
Pennock, David M, et al., "Social Choice Theory and Recommender Systems: Analysis of the Axiomatic Foundations of Collaborative Filtering", Proceedings of the Seventeenth National Conference on Artificial Intelligence and Twelfth Conference on Innovative Applications of Artificial Intelligence, (2000), 729-734.
Ramakrishnan, N, et al., "Privacy risks in recommender systems", IEEE Internet Computing, 5(6), (Nov.-Dec. 2001), 54-63.
Roe, Andy, "Amazon Adds Seller Services", [Online]. Retrieved from the Internet: <URL: http://web.archive.org/web/20000816024400/http://www.auctionwatch.com/awdaily/dailynews/august99/3-081899.html>, (Aug. 18, 1999), 2 pgs.
Sarwar, B., et al., "Analysis of recommendation algorithms for e-commerce", Proceedings of the 2nd ACM conference on EC, (2000), 158-167.
Schafer, J, et al., "E-commerce recommendation applications", Data Mining and Knowledge Discovery, 5(1-2), (2001), 115-153.
Schafer, J., et al., "E-Commerce Recommendation Applications", GroupLens Research Project, Dept. of Computer Science & Engineering, University of Minnesota, Minneapolis, (2001), 1-24.
Schafer, J. Ben, et al., "Recommender Systems in E-Commerce", Department of Science and Engineering—University of Michigan, (2001), 1-9.
Schien, Andrew I, et al., "Methods and Metrics for Cold-Start Recommendations", Proceedings of the 25th Annual International ACM SIGIR Conference on Research and Development in Information Retrieval (SIGIR 2002), (2002), 1-9.
Schubert, Petra, "Virtual Communities of Transaction:The Role of Personalization in Electronic Commerce", Electronic Markets Journal, 10(1), (2000), 1-13.
Seitz, Juergen, et al., "Impacts of Software Agents in E-Commerce Systems on Customer?s Loyalty and on Behavior of Potential Customers", Chapter 13 from Strategies for eCommerce Success: by Bijan Fazlollahi, IRM Press, (2000), 9 pgs.
Towle, Brendon, et al., "Knowledge Based Recommender Systems Using Explicit User Models", Knowledge Based Electronic Markets, (2000), 74-77.
Tran, T., "Hybrid Recommender Systems for Electronic Commerce", Proceedings of the Seventeenth National Conference on Artificial Intelligence (AAAI-00) Workshop on Knowledge-Based Electronic Markets, (2000), 78-84.
U.S. Appl. No. 10/263,224 U.S. Pat. No. 8,275,673, filed Oct. 1, 2002, Method and System to Recommend Further Items to a User of a Network-Based Transaction Facility Upon Unsuccessful Transacting With Respect to an Item.
U.S. Appl. No. 13/565,661, filed Aug. 2, 2012, Generating a Recommendation.
U.S. Appl. No. 09/769,546 U.S. Pat. No. 8,533,094, filed Jan. 24, 2001, On-Line Auction Sales Leads.

\* cited by examiner

ON-LINE AUCTION SALES LEADS

RELATED APPLICATIONS

This application is a continuation of U.S. application Ser. No. 09/769,546, filed Jan. 24, 2001, and entitled, "ON-LINE AUCTION SALES LEADS," which claims the benefit of U.S. Provisional Application No. 60/178,147, filed Jan. 26, 2000, and entitled "ON-LINE AUCTION SALES LEADS," each of which is incorporated herein by reference in its entirety.

BACKGROUND OF THE INVENTION

Field of the Invention

The present invention relates to online auctioning.

Statement of the Problem

On-line auctioning is becoming a popular vehicle for auctioning items. Indeed, more and more, retail (i.e., brick and mortar) businesses are moving into the on-line auction service as a legitimate retail sales vehicle.

When individuals bid on a particular item from a retail business occasionally such on-line auctioning retailers will contact the actual bidders on that item so as to solicit selling other items by encouraging them to visit a web site or to encourage them to bid on other items that they are auctioning.

In the world of direct mail marketing, it is well known that people who express an interest in a certain type of direct mail catalog have a propensity to buy that type of product or service. Hence, those individuals become a valuable mailing list contact for sales leads to other companies in the same or related retail sales areas.

A need exists to provide a service to retail sales organizations that use on-line auction services to generate sales leads.

SUMMARY OF THE INVENTION

The present invention solves this need by providing a unique and novel method for generating sales leads based upon not only actual bidders to an item being auctioned but also to those prospective bidders that visit the web page for an item being auctioned.

A method for generating on-line sales leads in an on-line auction is set forth. The method determines when a prospective bidder for an on-line auction of a specific item by a seller accesses the screen for the item. The method obtains the e-mail address of the prospective bidder and either correlates the e-mail address of the prospective bidder with the item or with a classification for the item. The correlated e-mail address is then delivered to the seller or to a purchaser and may be accompanied with information identifying the specific item, the classification, whether a bid was made or not, etc. Furthermore, the delivery occurs at periodic fixed time intervals or when a fixed number of e-mail addresses are obtained.

DETAILED DESCRIPTION OF THE INVENTION

The present invention provides the on-line auction service with the opportunity to increase its revenue stream by determining prospective bidders that access the web page for an item being auctioned and then to assemble a list of the prospective bidders information into a file for delivery to the entity auctioning the item off or other entities interested in the identity of such prospective bidders. A prospective bidder has already registered with the on-line auction service and is able, if he/she so chooses, to bid on an item of a seller being auctioned. A person who has not registered could view screens of items to be auctioned, but would not be a prospective bidder. Through registration, the prospective bidder agrees to the application of the present invention and, therefore, any privacy issues are contractually resolved.

Figure 1:
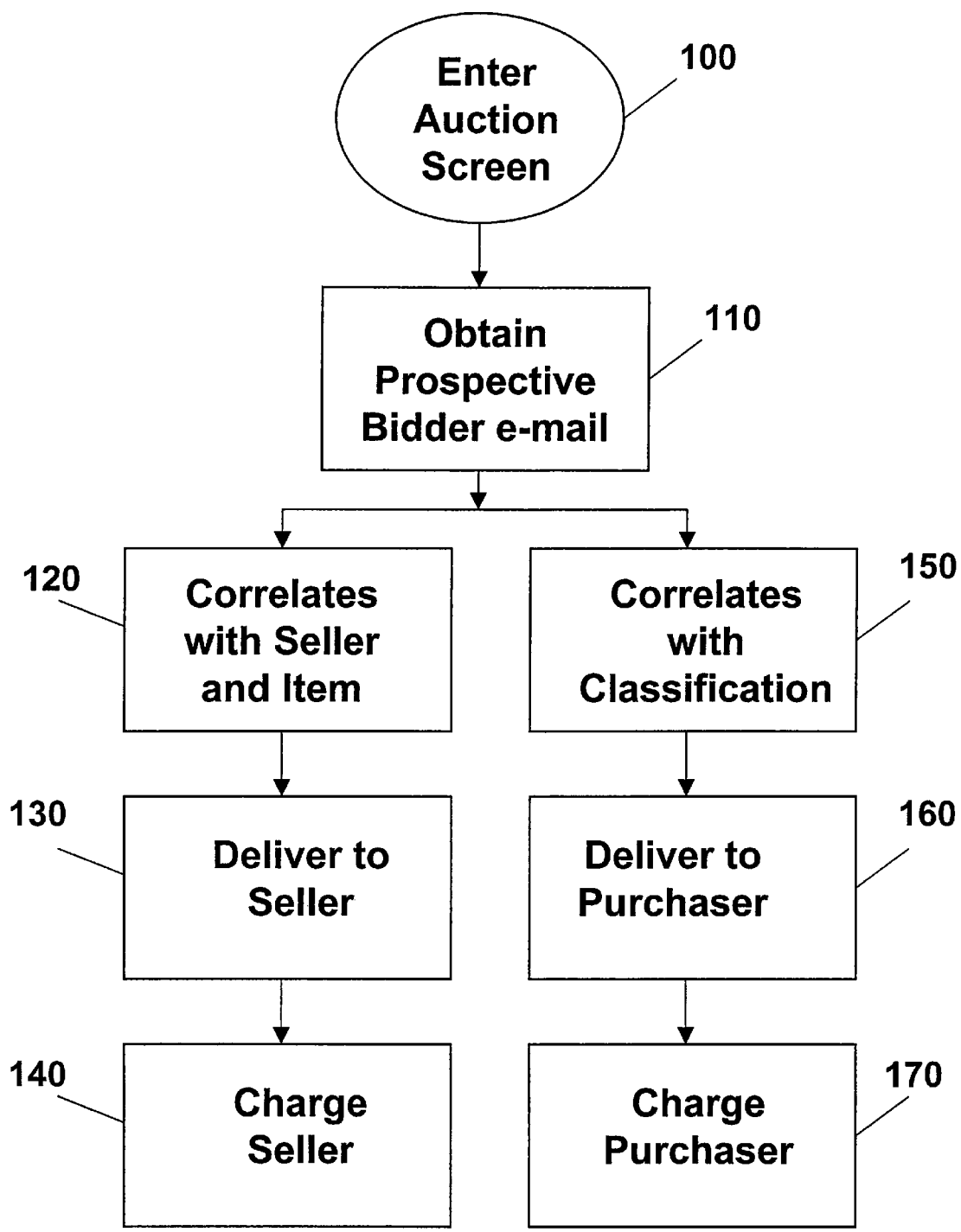
FIG. 1 sets forth the method of the present invention in one embodiment as a flow chart wherein sales leads are generated from on-line auctioning.
Figure 2:
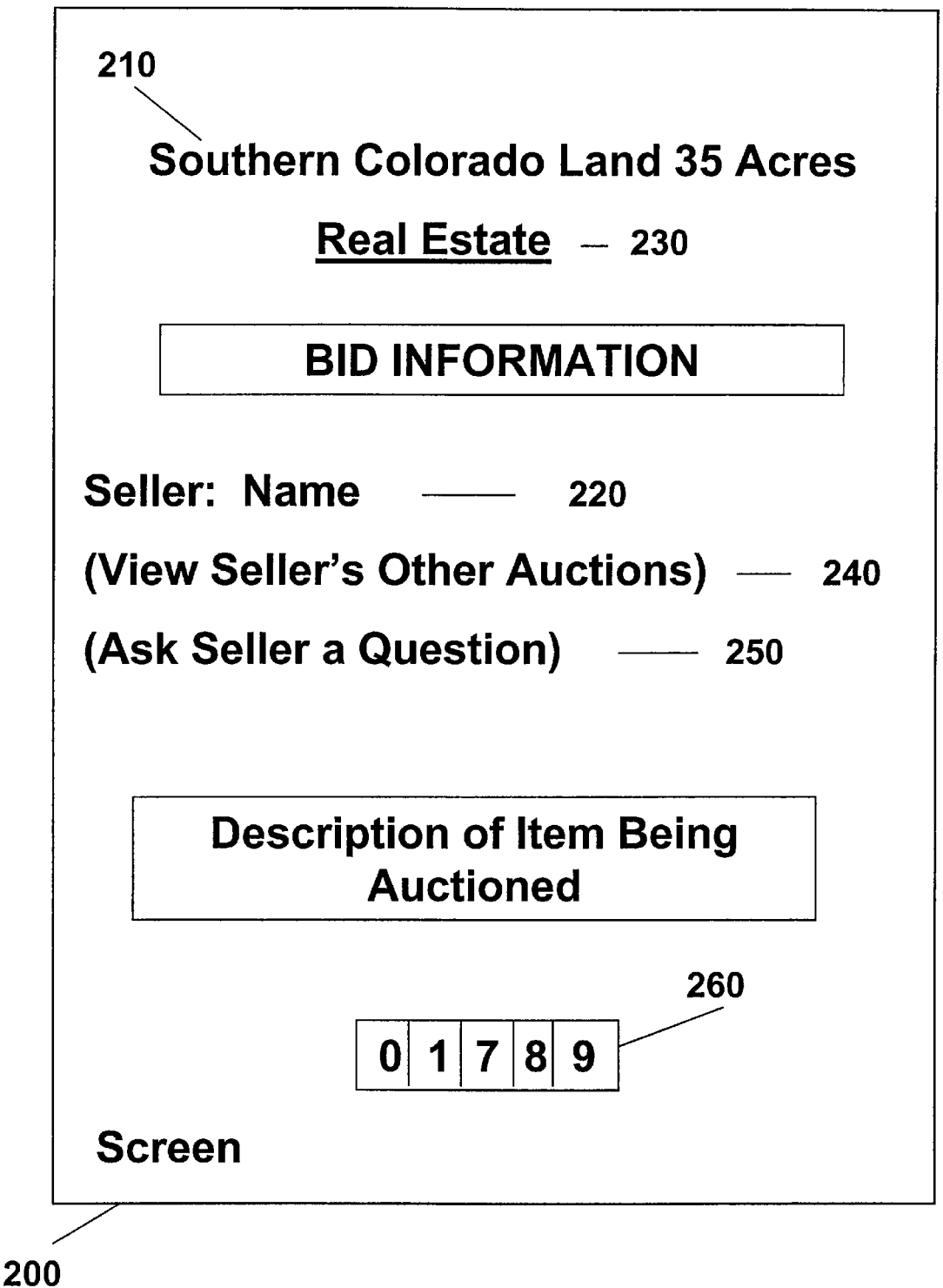
FIG. 2 sets forth a prior art screen display for the auction of an item.
Figure 3:
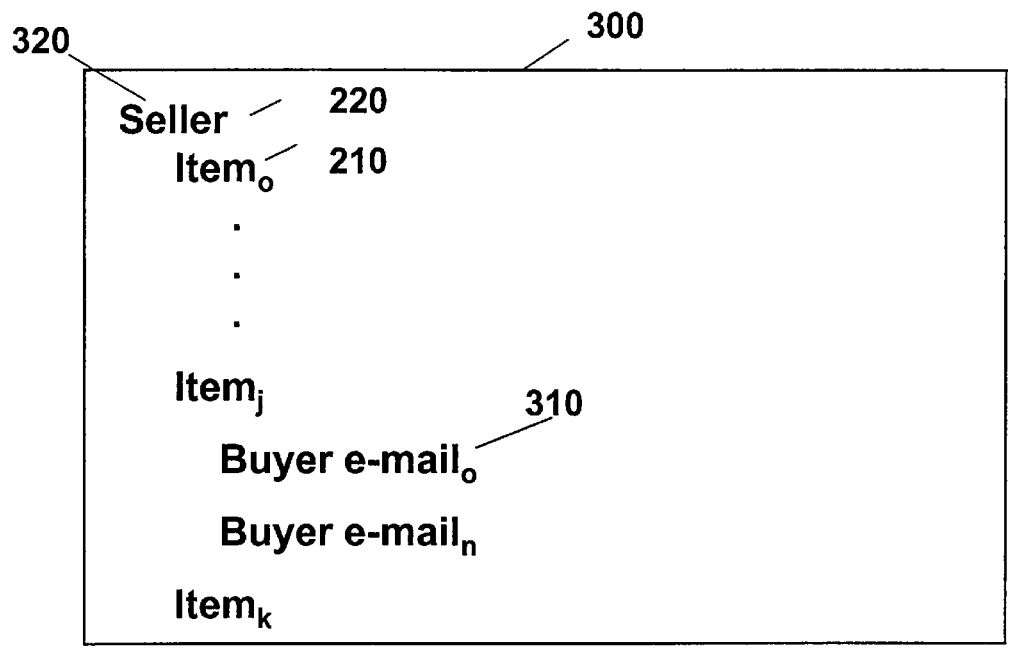
FIG. 3 sets forth a memory configuration for correlating prior e-mail addresses to a seller and to the items a seller is auctioning.

In FIG. 1 when a prospective bidder enters a particular auction screen 200, as for example shown in FIG. 2, for an item being auctioned, the method in stage 110 obtains the prospective bidder's e-mail address. This occurs in the software of system, not shown, of the on-line auction service. In stage 120 the method of the present invention correlates the prospective bidder's e-mail address obtained in stage 110 with the item 210 of the seller 220. In addition, it can also be correlated with the seller 220 and/or any other type of key word or number criteria such as classification words 230. Indeed, the seller 220 may have other items 240 being auctioned off and the seller can obtain the identity of all prospective bidders accessing the seller's other web pages for each of its items being auctioned even though the prospective bidder never places a bid. The seller 220 knows that this prospective bidder has expressed interest in this type of item 210 being sold. In FIG. 3, correlations occurring in stage 120 are stored in memory 300. It is to be expressly understood that any of a number of conventional approaches can be utilized for associating data sales such as seller identity 220, item field 210, and buyer e-mail information 310.

In FIG. 3, the seller 220 has a number of separate items 210 for sale and the prospective bidder information 310 is accumulated under each different item. This provides important information to the seller. As indicated, those prospective buyers 310 that have expressed an interest in that type of item even though no bid was ever made. It is to be expressly understood that bidders who make actual bids could also have their e-mail addresses 310 inserted into memory 300 so that a seller 220 has a complete data file of not only prospective bidders, but also actual bidders. In the example of FIG. 2, no actual bids occurred with a time lapse of eight minutes and one second. Clearly under the conventional approach, a prospective bidder, even though not making a bid, can e-mail 250 a message to the seller and make further inquiries about the item being auctioned even though no bid is made. However, the seller 220 is denied the benefit of all the other prospective bidders who contact the web page may spend time reviewing it and then leave the web page without asking the seller a question 250. How important this service is to the on-line auction and to the seller 270 is indicated by the hit counter 260 for the item 210 which in the example of FIG. 2 shows 1,789 hits for that example. The seller 220 under the conventional approach is denied this information and under the teachings of the present invention receives significant and valuable information.

In stage 130, from time to time, the list of e-mail prospective sales leads (i.e., the correlated information obtained in stage 120) from memory 300 is delivered to the seller 220 in data format 320 or any other suitable format. This delivery can occur once a week, once a day, once a month, or whenever a predetermined number such as 100 is obtained. With the delivery to the seller 220 in stage 130 in stage 140 the seller is charged an appropriate fee for obtaining this information such as pennies per e-mail address, etc. Any suitable form of compensation can be utilized to charge the seller, but it is typically done automatically against the seller's credit card which is already on record with the on-line auctioning service.

Alternatively, and as shown in stage 150, the auction service has categories 230 under which the items being auctioned are categorized. For example, the item 210 in FIG. 2 would be classified at eBay Inc. as follows: Miscellaneous: Real Estate. In stage 150, whenever a prospective bidder, whether or not they are actually making a bid, accesses a web page 200 based upon category classifications, the e-mail address is correlated with the classification language and is assembled. In stage 160 this information correlated in stage 150 is delivered to purchasers desiring such e-mail addresses based upon classification information. Again the compensation to the on-line service for this service can occur in stage 170 where the credit card of a purchase is automatically charged. Delivery occurs, as before, from time to time.

Figure 4:
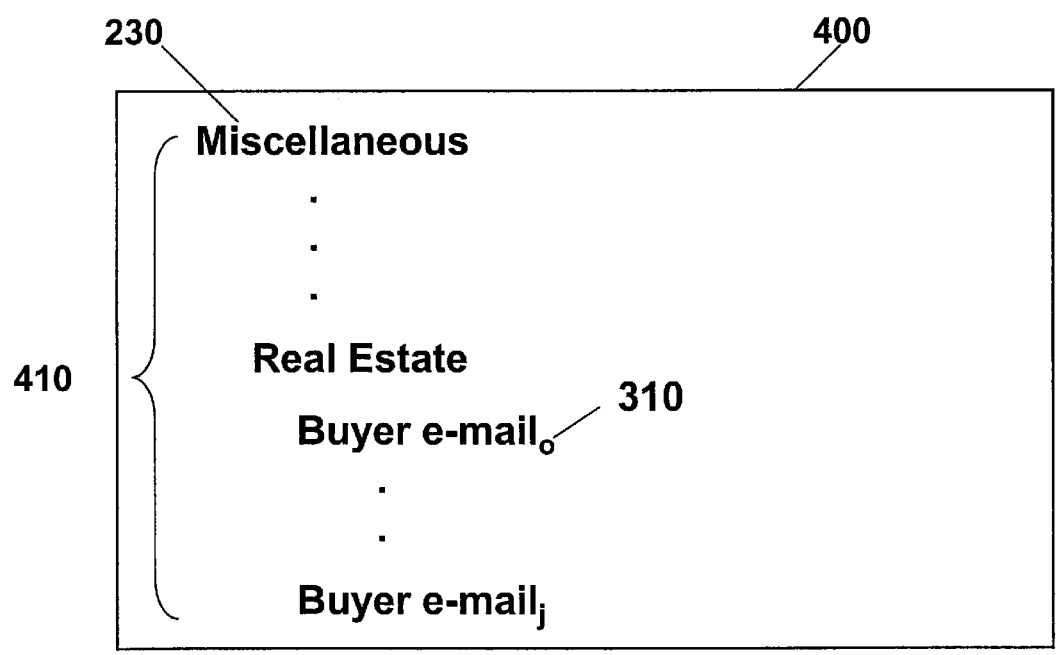
FIG. 4 sets forth a memory configuration for correlating buyer e-mail addresses to classification topics.

In FIG. 4, memory location 400 is shown wherein the classification words 230 are used as data fields into which the information 310 is inserted. This data list 410 is then delivered to purchasers as discussed above for FIG. 3.

It is to be expressly understood that memory 300 and 400 can be the same memory and that the data fields can be combined together. In this environment, it can be a conventional relational database. Buyer information 310 can be accessed either by seller, by item, by key word 230 or any combination thereof.

Figure 5:
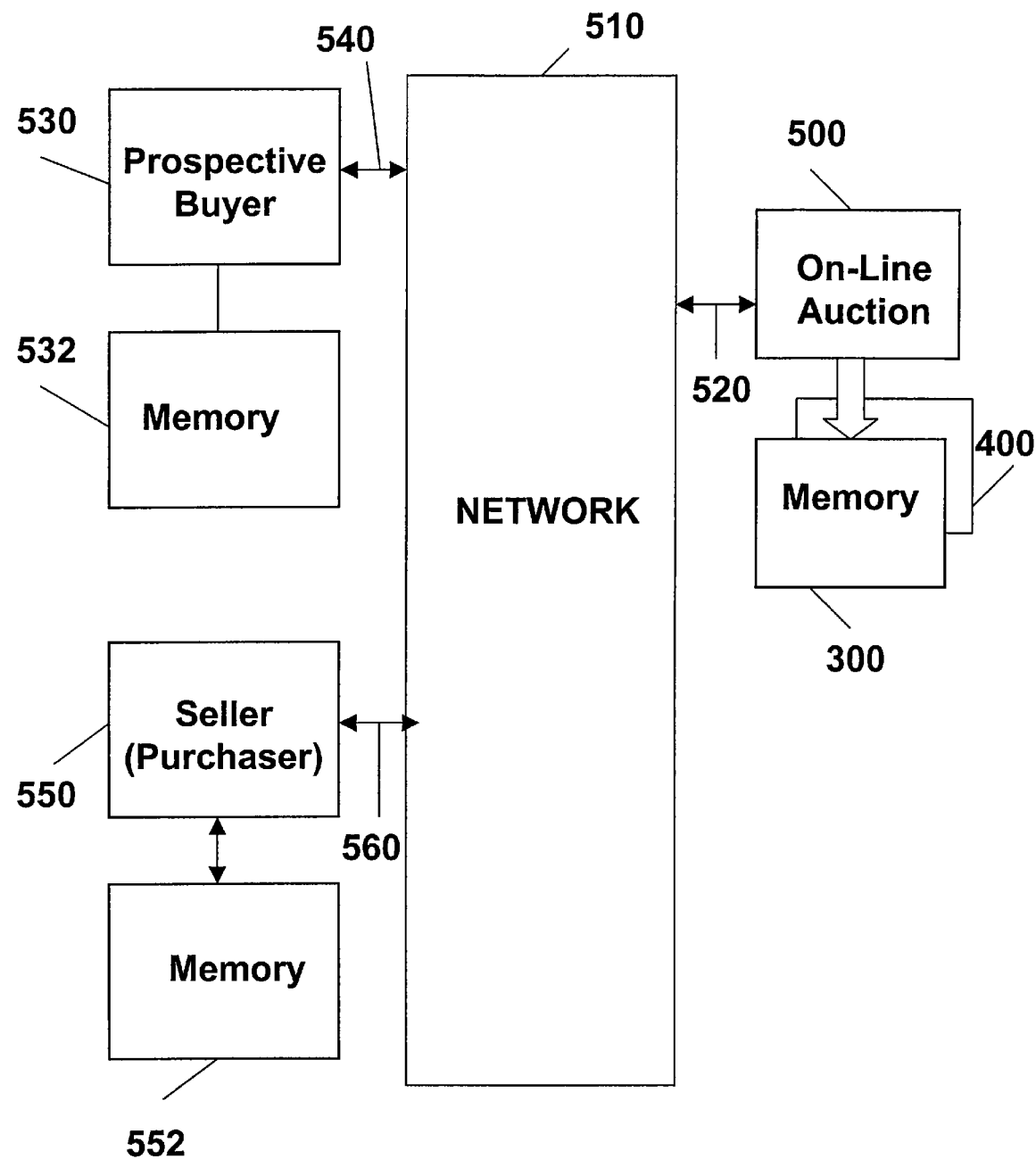
FIG. 5 sets forth the block diagram environment showing the operation of the present invention.

In FIG. 5, the block diagram environment showing the implementation of the method of the present invention is generally set forth. It is well within the skill of the art to set up Internet businesses including on-line auction services. An on-line auction service 500 is shown interconnected to a communications network 510 over connection 520. The communication network 510 can comprise many different components and is essentially transparent to the on-line auction service 500. Also connected to the communication network 510 is at least one prospective buyer 530 in communication with the network over communication link 540 and at least one seller 550 also in communication with the network 510 over communication link 560. Typically, the prospective buyer 530 and the seller 550 have home based or office based personal computers which are readily available from a large number of sources. Each computer system 530 and 550 is conventionally interconnected to the network 510 over a suitable communication device such as a modem or a DSL line 540, 560.

With reference back to FIG. 1, the seller 550 in a conventional fashion sets up an account with the on-line auction service 500 and creates a web page for an item such as shown in FIG. 2. The on-line auction service 500 then sets up the memory field shown in FIG. 3 for memory 300 for the seller and for the item so that when a prospective buyer such as buyer 530 accesses the online auction web site his/her e-mail address is recorded and stored in memory 300. This occurs in stages 100, 110, and 120, as previously discussed. Subsequently, it is then delivered from memory 300 to seller 550 and into the seller's memory 552. Subsequently, the seller 550 independent of the on-line service 500 can deliver an e-mail direct advertisement directly to the prospective buyer 530 which is conventionally stored in an internal memory 532. It is to be understood and as shown in FIG. 5 that the purchaser can be in the position of the seller with a computer system 550 to open up an account with the on-line auction service 500 so that memory files 400 are generated as shown in FIG. 4 for that purchaser for subsequent delivery into the purchaser's memory 552.

Hence, what has been shown and described above is a convenient method for providing sales leads to the retailers that have products or services in these specific classification categories. To provide sellers and/or purchasers with e-mail contact to persons that have already expressed an interest in that type of product or service. Furthermore, it provides a convenience source of revenues to the online service.

A method for generating on-line sales leads in an on-line auction is set forth. The method determines when a prospective bidder for an on-line auction of a specific item by a seller accesses the screen for the item. The method obtains the e-mail address of the prospective bidder. The determination and the obtaining can occur in any order. The method then correlates the e-mail address of the prospective bidder with the item or with a classification for the item. The correlated e-mail address is then delivered to the seller of the item or to a purchaser and may be accompanied with information identifying the specific item, the classification, whether a bid was made or not, etc. Furthermore, the delivery occurs at periodic fixed time intervals or when a fixed number of e-mail addresses are obtained.

The above disclosure sets forth a number of embodiments of the present invention. Those skilled in this art will however appreciate that other arrangements or embodiments, not precisely set forth, could be practiced under the teachings of the present invention and that the scope of this invention should only be limited by the scope of the following claims.

I claim:

1. A method comprising:
performing operations, using one or more processors of a computing service, to insert information about prospective buyers into a data file to supplement information about expressed offers in the data file with respect to a classification of an item, the operations comprising:
setting up a memory field in a memory, using the one or more processors of the computing service, for a seller of at least one item associated with the classification of the item so that when a prospective buyer accesses a screen for the item, the information about the prospective buyer is stored in the memory; and
delivering contents of the memory, using the one or more processors of the computing service, as the data file to the seller of the at least one item associated with the classification of the item, the delivering including transferring the data file from the memory at the computing service to a memory of a machine of the seller, wherein the data file is made accessible at the machine of the seller as a complete data file of the expressed offers supplemented with the information about prospective buyers with respect to the classification of the item.

2. The method of claim 1, wherein the information about the prospective buyer includes an email address associated with the prospective buyer.

3. The method of claim 1, wherein the data file indicates whether the prospective buyer made a bid on the item.

4. The method of claim 1, wherein the information about the prospective buyer includes a number of accesses of the screen by the prospective buyer over a time period.

5. The method of claim 1, wherein the data file includes information about when the prospective buyer accessed the screen.

6. The method of claim 1, wherein keywords associated with the classification of item are used as data fields for insertion of the information about the prospective buyer into the memory at the computing service.

7. The method of claim 1, wherein the data file includes information pertaining to additional perspective buyers accumulated for a plurality of items under the classification of the item and the delivering of the data file includes delivering the information pertaining to the prospective buyer and the additional prospective buyers in a data list formatted with respect to the classification of the item.

8. A system comprising:
one or more computer memories and one or more computer processors of a computing service, the one or more processors of the computing service configured to perform operations to insert information about prospective buyers into a data file to supplement information about expressed offers in the data file with respect to a classification of an item, the operations comprising:
setting up the one or more memories at the computing service for a seller of at least one item associated with the classification of the item such that when a prospective buyer accesses a screen for the item, the information about the prospective buyer is stored in the one or more memories; and
delivering contents of the one or more memories at the computing service as the data file to the seller of the at least one of item associated with the classification of the item, the delivering including transferring the data file from the one or more memories at the computing service to a memory of a machine of the seller, wherein the data file is made accessible at the machine of the seller as a complete data file of the expressed offers supplemented with the information about prospective buyers with respect to the classification of the item.

9. The system of claim 8, wherein the information about the prospective buyer includes an email address associated with the prospective buyer.

10. The system of claim 8, wherein the data file indicates whether the prospective buyer made a bid on the item.

11. The system of claim 8, wherein the information about the prospective buyer includes a number of accesses of the screen by the prospective buyer over a time period.

12. The system of claim 8, wherein the data file includes information about when the prospective buyer accessed the screen.

13. The system of claim 8, wherein the data file is delivered based on a number of the prospective buyers reaching a fixed number.

14. A non-transitory machine-readable medium embodying a set of instructions that, when incorporated into a memory of a computer system, configure the computer system to perform operations to insert information about prospective buyers into a data file to supplement information about expressed offers in the data file with respect to a classification of an item, the operations comprising:
setting up an additional memory at the computer system for a seller of at least one item associated with the classification of the item such that when a prospective buyer accesses a screen for the item, the information about the prospective buyer is stored in the additional memory; and
delivering contents of the additional memory at the computer system as the data file to the seller of the at least one item associated with the classification of the item, the delivering including transferring the data file from the additional memory at the computer system to a memory of a machine of the seller, wherein the data file is made accessible at the machine of the seller as a complete data file of the expressed offers supplemented with the information about prospective buyers with respect to the classification of the item.

15. The non-transitory machine-readable medium of claim 14, wherein the data file indicates whether the prospective buyer made a bid on the item.

16. The non-transitory machine-readable medium of claim 14, wherein the information about the prospective buyer includes a number of accesses of the screen by the prospective buyer over a time period.

17. The non-transitory machine-readable medium of claim 14, wherein the data file includes information about when the prospective buyer accessed the screen.

* * * * *